United States Patent
Hasegawa et al.

(10) Patent No.: US 9,833,770 B2
(45) Date of Patent: Dec. 5, 2017

(54) CATALYST PRODUCTION METHOD, ELECTRODE CATALYST FOR FUEL CELL PRODUCED BY THIS METHOD, AND CATALYST PRODUCTION APPARATUS

(75) Inventors: Shigeki Hasegawa, Sunto-gun (JP); Satoru Aizawa, Ota-ku (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 742 days.

(21) Appl. No.: 14/241,626

(22) PCT Filed: Aug. 29, 2012

(86) PCT No.: PCT/IB2012/001659
§ 371 (c)(1),
(2), (4) Date: Feb. 27, 2014

(87) PCT Pub. No.: WO2013/030652
PCT Pub. Date: Mar. 7, 2013

(65) Prior Publication Data
US 2014/0205930 A1   Jul. 24, 2014

(30) Foreign Application Priority Data
Aug. 30, 2011   (JP) .................. 2011-187703

(51) Int. Cl.
*B01J 23/42*    (2006.01)
*H01M 4/92*    (2006.01)
(Continued)

(52) U.S. Cl.
CPC ........... *B01J 23/42* (2013.01); *H01M 4/8803* (2013.01); *H01M 4/8817* (2013.01);
(Continued)

(58) Field of Classification Search
CPC .... B01J 23/42; H01M 4/8803; H01M 4/8817; H01M 4/8825; H01M 4/8882;
(Continued)

(56) References Cited

U.S. PATENT DOCUMENTS 4,970,093 A    11/1990   Sievers et al.
5,789,027 A    8/1998   Watkins et al.
(Continued)

FOREIGN PATENT DOCUMENTS

CN    101405908 A    4/2009
JP    2000-17442 A    1/2000
(Continued)

OTHER PUBLICATIONS

Bayrakceken, A. et al. "Pt-Based Electrocatalysts for Polymer Electrolyte Membrane Fuel Cells Prepared by Supercritical Deposition Technique", vol. 179, pp. 532-540, published Jan. 4, 2008.*
(Continued)

*Primary Examiner* — Miriam Stagg
*Assistant Examiner* — Lilia V Nedialkova
(74) *Attorney, Agent, or Firm* — Andrews Kurth Kenyon LLP (57) ABSTRACT

A method for producing a catalyst supporting a metal or an alloy on a support, including: independently controlling a temperature of a first supercritical fluid to be first temperature, the first supercritical fluid containing a precursor of the metal or precursor of the alloy that is dissolved in a supercritical fluid; independently controlling a temperature of the support to be a second temperature higher than the temperature of the first supercritical fluid; and supplying the first supercritical fluid controlled to the first temperature to the support, to cause the metal or the alloy to be supported on the support.

17 Claims, 4 Drawing Sheets

(51) Int. Cl.
*H01M 4/88* (2006.01)
*H01M 4/90* (2006.01)

(52) U.S. Cl.
CPC ....... *H01M 4/8825* (2013.01); *H01M 4/8882* (2013.01); *H01M 4/8892* (2013.01); *H01M 4/9041* (2013.01); *H01M 4/9075* (2013.01); *H01M 4/9083* (2013.01); *H01M 4/92* (2013.01); *H01M 4/921* (2013.01); *H01M 4/925* (2013.01); *H01M 4/926* (2013.01)

(58) Field of Classification Search
CPC ............. H01M 4/8892; H01M 4/9041; H01M 4/9075; H01M 4/9083; H01M 4/92; H01M 4/921; H01M 4/925; H01M 4/926
See application file for complete search history.

(56) References Cited

U.S. PATENT DOCUMENTS

| | | |
|---|---|---|
| 6,194,650 B1 | 2/2001 | Wakayama et al. |
| 2003/0056813 A1 | 3/2003 | Marshall et al. |
| 2004/0018416 A1 | 1/2004 | Choi et al. |
| 2006/0093741 A1 | 5/2006 | Chen et al. |
| 2006/0278254 A1 | 12/2006 | Jackson |
| 2007/0042259 A1 | 2/2007 | Fan et al. |
| 2007/0190310 A1* | 8/2007 | Yusa ................ B29C 37/0032 428/323 |
| 2008/0020261 A1 | 1/2008 | Hendricks et al. |
| 2008/0220244 A1 | 9/2008 | Wai et al. |
| 2009/0004568 A1 | 1/2009 | Hirose et al. |
| 2009/0075157 A1 | 3/2009 | Pak et al. |
| 2010/0075201 A1 | 3/2010 | Nakanishi et al. |
| 2011/0008617 A1 | 1/2011 | Hata et al. |
| 2012/0052414 A1 | 3/2012 | Hama et al. |
| 2012/0088650 A1 | 4/2012 | Hama et al. |
| 2012/0225771 A1* | 9/2012 | Miyazawa ............... B01J 3/008 502/171 |

FOREIGN PATENT DOCUMENTS

| | | |
|---|---|---|
| JP | 2005-203332 A | 7/2005 |
| JP | 2006-273613 A | 10/2006 |
| JP | 2008-146860 A | 6/2008 |
| JP | 2008-270053 A | 11/2008 |
| JP | 2011-3531 A | 1/2011 |
| WO | 2005069955 A2 | 4/2005 |
| WO | 2006080702 A1 | 3/2006 |
| WO | 2011/058886 A1 | 5/2011 |

OTHER PUBLICATIONS

Hiramatsu, M. and M. Hori, "Preparation of Dispersed Platinum Nanoparticles on a Carbon Nanostructured Surface Using Supercritical Fluid Chemical Deposition", vol. 3, pp. 1559-1572, published Mar. 3, 2010.*
"Circulation". The American Heritage Dictionary of the English Language, Fifth Ed., Houghton Mifflin Harcourt Publishing Company, 2017.*
Notice of Allowance dated Feb. 27, 2014 in U.S. Appl. No. 13/318,383.
Advisory Action dated Dec. 3, 2013 in U.S. Appl. No. 13/318,383.
Final Office Action dated Jul. 24, 2013 in U.S. Appl. No. 13/318,383.
Office Action dated Jan. 31, 2013 in U.S. Appl. No. 13/318,383.

* cited by examiner

CATALYST PRODUCTION METHOD, ELECTRODE CATALYST FOR FUEL CELL PRODUCED BY THIS METHOD, AND CATALYST PRODUCTION APPARATUS

CROSS REFERENCE TO RELATED APPLICATION

This is a national phase application based on the PCT International Patent Application No. PCT/IB2012/001659 filed on Aug. 29, 2012, claiming priority to Japanese application No. 2011-187703 filed Aug. 30, 2011, the entire contents of both of which are incorporated herein by reference.

BACKGROUND OF THE INVENTION

1. Field of the Invention

The invention relates to a catalyst production method for preventing uneven supporting of a metal or the like supported on a support, an electrode catalyst for fuel cell produced by the method, and a catalyst production apparatus.

2. Description of Related Art

A fuel cell directly converts a chemical energy into an electrical energy by supplying a fuel and an oxidant to two electrically connected electrodes, and electrochemically effecting oxidation of the fuel. Unlike thermal power generation, the fuel cell is not restricted by the Carnot's cycle, and hence is high in energy conversion efficiency. The fuel cell is generally formed of a lamination of a plurality of single cells each having, as a basic structure, a membrane/electrode joint unit in which an electrolyte membrane is sandwiched between a pair of electrodes.

The electrode of the fuel cell generally includes an electrode catalyst. In recent years, as a production method of an electrode catalyst for fuel cell, there is a method in which a catalyst metal is supported on a support using a supercritical fluid. In Japanese Patent Application Publication No. 2000-017442 (JP 2000-017442 A), there is disclosed a method for producing a metal-supported material by obtaining the metal-supported material through a dissolution step of dissolving a metal precursor in a supercritical fluid, and preparing a precursor fluid, and a coating step of bringing the precursor fluid into contact with a base material (Claim 1 of JP 2000-017442 A).

On the other hand, in Japanese Patent Application Publication No. 2006-273613 (JP 2006-273613 A), there is disclosed a method for producing a metal-supported carbon nanostructure body, by including a treatment step of subjecting a carbon nanostructure body previously formed on a substrate, and heated to 300 to 800° C. to a contact treatment with a compound of the metal in a state dissolved in a supercritical fluid (Claims 4 and 5 of JP 2006-273613 A).

JP 2000-017442 A describes to the following effect: in the presence of a porous base material, a platinum precursor is dissolved in supercritical carbon dioxide, thereby to allow the platinum precursor to be adsorbed on the porous base material; then, the supercritical carbon dioxide is removed, and burning is performed, thereby to allow platinum to be supported on the porous base material (paragraphs [0023] to [0025] of JP 2000-017442 A). However, with such a procedure, the platinum precursor may not be adsorbed in a sufficient amount on the porous base material within a treatment time as short as less than 1 hour. FIG. 2 of JP 2006-273613 A shows a configuration diagram of an apparatus including a reaction vessel having a silicon substrate including a carbon nanostructure body formed thereon and a micro heater, a stirring vessel for accommodating a platinum catalyst dissolved in a supercritical carbon dioxide, and a valve that is able to open and close the passage between the reaction vessel and the stirring vessel as an apparatus for allowing platinum to be supported on a carbon nanostructure body. However, when such an apparatus is used, there is a possibility that the temperature of the supercritical fluid cannot be controlled with precision.

SUMMARY OF THE INVENTION

The invention provides a catalyst production method for preventing uneven supporting of a metal or the like supported on a support during a supporting treatment for a short treatment time, an electrode catalyst for fuel cell produced by the method, and a catalyst production apparatus.

A catalyst production method of a first aspect of the invention is a method for producing a catalyst supporting a metal or an alloy on a support therein. The method includes: independently controlling a temperature of a first supercritical fluid to be first temperature, the first supercritical fluid containing a precursor of the metal or precursor of the alloy that is dissolved in a supercritical fluid; independently controlling a temperature of the support to be a second temperature higher than the temperature of the first supercritical fluid; and supplying the first supercritical fluid controlled to be the first temperature to the support, to cause the metal or the alloy to be supported on the support.

In the production method of the first aspect of the invention, it is also acceptable that in the supplying the first supercritical fluid, the first supercritical fluid controlled to be first temperature is circulated between a first heat exchanger that controls the temperature of the first supercritical fluid at the first temperature and the support.

In the production method of the first aspect of the invention, it is also acceptable that the precursor is added to the first supercritical fluid in an amount equivalent to an amount of the precursor consumed to cause the metal or the alloy to be supported on the support.

In the production method of the first aspect of the invention, it is also acceptable that, the first supercritical fluid is supplied to the support, to cause the precursor to be adsorbed on the support, and then, the precursor is thermally decomposed at a third temperature, to cause the metal or the alloy to be precipitated on the support.

In the production method of the first aspect of the invention, it is also acceptable that the second temperature of the support is higher than the first temperature of the first supercritical fluid, and less than the third temperature at which the precursor is thermally decomposed.

In the production method of the first aspect of the invention, it is also acceptable that a difference between the first temperature of the first supercritical fluid and the second temperature of the support is set at 5 to 100° C.

In the production method of the first aspect of the invention, it is also acceptable that the third temperature of the support is higher than the second temperature of the support.

In the production method of the first aspect of the invention, it is also acceptable that a difference between the second temperature of the support and the third temperature of the support is set at 20 to 500° C.

In the production method of the first aspect of the invention, it is also acceptable that the third temperature of the support is equal to or higher than a temperature at which the precursor is thermally decomposed.

In the production method of the first aspect of the invention, it is also acceptable that the precursor is a precursor of one metal or a precursor of an alloy including two or more metals selected from the group consisting of platinum, cobalt, palladium, copper, titanium, gold, silver, ruthenium, chromium, iron, manganese, nickel, rhodium, iridium, and tin.

In the production method of the first aspect of the invention, it is also acceptable that the support is at least one support selected from the group consisting of carbon nanotube, carbon powder, titanium, silicon, tin, copper, titania, silica, and tin oxide.

In the production method of the first aspect of the invention, it is also acceptable that the first supercritical fluid is at least one supercritical fluid selected from the group consisting of carbon dioxide, and trifluoromethane ($CHF_3$).

In the production method of the first aspect of the invention, it is also acceptable that a temperature of the second supercritical fluid containing an ionomer dissolved therein is independently controlled to be a fourth temperature; that the temperature of the support is independently controlled to be a fifth temperature higher than the fourth temperature of the second supercritical fluid; and that the second supercritical fluid controlled to be the fourth temperature is supplied to the support and the metal or the alloy supported on the support, thereby coating the support and the metal or the alloy supported on the support with the ionomer.

In the production method of the first aspect of the invention, it is also acceptable that a second heat exchanger for controlling the temperature of the second supercritical fluid to be the fourth temperature is disposed, and that the second supercritical fluid controlled to be the fourth temperature is circulated between the second heat exchanger and the support, to cause the second supercritical fluid to the support.

In the production method of the first aspect of the invention, it is also acceptable that the ionomer is added to the second supercritical fluid in an amount equivalent to an amount of the ionomer consumed by coating the support, and the metal or the alloy supported on the support with the ionomer.

In the production method of the first aspect of the invention, it is also acceptable that a difference between the fourth temperature of the second supercritical fluid and the fifth temperature of the support is set at 5 to 100° C.

In the production method of the first aspect of the invention, it is also acceptable that the ionomer is at least one ionomer selected from the group consisting of perfluorocarbon sulfonate resins, aromatic polyether sulfonate resins, aromatic polyimide sulfonate resins, and polybenzsulfonate resins.

In the production method of the first aspect of the invention, it is also acceptable that the second supercritical fluid is at least one supercritical fluid selected from the group consisting of trifluoromethane ($CHF_3$), tetrafluoroethylene ($CF_2=CF_2$), 1,1,2,2-tetrafluoroethane ($CHF_2CHF_2$), pentafluoroethane ($CF_3CHF_2$), water, ethanol, and methanol.

An electrode catalyst for fuel cell of the first aspect of the invention may be produced by the catalyst production method.

A catalyst production apparatus of a second aspect of the invention is an apparatus for producing a catalyst supporting a metal or an alloy on a support therein. The apparatus includes one reaction vessel. The reaction vessel includes therein, a first temperature control unit for independently controlling a temperature of a first supercritical fluid to be a first temperature, the first supercritical fluid containing a precursor of a metal or precursor of an alloy that are dissolved in the first supercritical fluid; a second temperature control unit for independently controlling a temperature of the support to be a second temperature higher than the temperature of the first supercritical fluid; and a first transfer unit for supplying the first supercritical fluid controlled to be the first temperature to the support.

In the production apparatus of the second aspect of the invention, it is also acceptable that a first heat exchanger is disposed as the first temperature control unit, and that the first supercritical fluid is circulated between the first heat exchanger and the support, thereby to supply the first supercritical fluid to the support.

The production apparatus of the second aspect of the invention may further include: an addition unit for adding the precursor to the first supercritical fluid in an amount equivalent to an amount of the precursor consumed to cause the metal or the alloy to be supported on the support.

In the production apparatus of the second aspect of the invention, it is also acceptable that the precursor is a precursor of one metal or a precursor of an alloy including two or more metals selected from the group consisting of platinum, cobalt, palladium, copper, titanium, gold, silver, ruthenium, chromium, iron, manganese, nickel, rhodium, iridium, and tin.

In the production apparatus of the second aspect of the invention, it is also acceptable that the support is at least one support selected from the group consisting of carbon nanotube, carbon powder, titanium, silicon, tin, copper, titania, silica, and tin oxide.

In the production apparatus of the second aspect of the invention, it is also acceptable that the first supercritical fluid is at least one supercritical fluid selected from the group consisting of carbon dioxide, and trifluoromethane ($CHF_3$).

The production apparatus of the second aspect of the invention may further include: a third temperature control unit for independently controlling a temperature of a second supercritical fluid containing an ionomer dissolved therein to be fourth temperature; a fourth temperature control unit for independently controlling the temperature of the support to be a fifth temperature higher than the fourth temperature of the second supercritical fluid; and a second transfer unit for directly supplying the second supercritical fluid controlled to be the fourth temperature to the support and the metal or the alloy supported on the support.

In the production apparatus of the second aspect of the invention, it is also acceptable that a second heat exchanger is disposed as the third temperature control unit, and that the second supercritical fluid is circulated between the second heat exchanger and the support.

The production apparatus of the second aspect of the invention may further include an addition unit for adding the ionomer to the second supercritical fluid in an amount equivalent to an amount of the ionomer consumed by coating the support, and the metal or the alloy supported on the support with the ionomer.

In the production apparatus of the second aspect of the invention, it is also acceptable that the ionomer is at least one ionomer selected from the group consisting of perfluorocarbon sulfonate resins, aromatic polyether sulfonate resins, aromatic polyimide sulfonate resins, and polybenzsulfonate resins.

In the production apparatus of the second aspect of the invention, it is also acceptable that the second supercritical fluid is at least one supercritical fluid selected from the group consisting of trifluoromethane ($CHF_3$), tetrafluoroethylene ($CF_2—CF_2$), 1,1,2,2-tetrafluoroethane ($CHF_2CHF_2$), and pentafluoroethane ($CF_3CHF_2$).

With the catalyst production method of the first aspect of the invention, the temperature of the metal or alloy precursor-dissolved first supercritical fluid and the temperature of the support are each independently controlled. In addition, the first supercritical fluid is directly supplied to the support. Accordingly, it is possible to continuously continue supplying the first supercritical fluid at a predetermined temperature to the support while keeping the temperature of the first supercritical fluid.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Below, a catalyst production method of the invention will be mainly described, and a catalyst production apparatus embodying the catalyst production method will be appropriately described, if required.

With a configuration in which a support, a metal precursor, and a supercritical fluid are only allowed to coexist in the same reaction vessel as described in JP 2000-017442 A, the metal precursor may not be adsorbed in a sufficient amount on the support in a short treatment time (e.g., a treatment time of less than 1 hour) at a level required for a mass production process. This is due to the fact that several hours to several tens of hours is required until the support and the metal precursor spontaneously reach the adsorption equilibrium state. In the period until the adsorption equilibrium state is reached, the metal precursor is also adsorbed on other sites than the support, such as the inner wall surface of the reaction vessel. Accordingly, the amount of the metal precursor to be adsorbed on the support decreases, also resulting in the reduction of the yield of the resulting catalyst. Therefore, shortening of the time until the adsorption equilibrium state is reached requires an urging force for allowing the metal precursor to be adsorbed on the support.

Whereas, even with a configuration in which the reaction vessel is merely equipped with a heater for heating the support as described in JP 2006-273613 A, the metal precursor may not be adsorbed in a sufficient amount on the support. This is due to the following fact: the radiant heat from a heater heats the supercritical fluid and the reaction vessel inner wall surface with time; accordingly, the metal precursor is precipitated in the supercritical fluid and on the inner wall surface of the reaction vessel, resulting in the reduction of the amount of the metal precursor to be adsorbed onto the support; this also results in the reduction of the yield of the resulting metal catalyst. Further, also at the initial stage of the reaction, the metal precursor dissolved in the supercritical fluid is precipitated at the instant of coming into contact with the high-temperature support surface. Accordingly, the metal precursor does not permeate into the support inside, and hence it may be precipitated unevenly on the support surface. Therefore, it is necessary to control the temperature of the supercritical fluid with precision.

In accordance with the invention, the supercritical fluid and the support are each independently temperature-controlled, and, the temperature-controlled supercritical fluid is directly supplied to the support. This provides a production method capable of promoting the adsorption of the metal precursor onto the support, an electrode catalyst for fuel cell produced by the method, and a catalyst production apparatus.

In accordance with the production method of the invention, there are provided a region in which the temperature of a supercritical fluid including a precursor of a metal or precursor of an alloy (which may be hereinafter referred to as a precursor) dissolved therein is independently controlled (first region), and a region in which the temperature of the support is independently controlled (second region); and the supercritical fluid is directly supplied to the support. Incidentally, in the present specification, the term "supercritical fluid" to be supplied to the support is assumed to represent not only the supercritical fluid itself but also the supercritical fluid including the precursor dissolved therein. The production method of the invention includes (1) a step of forming the first region, (2) a step of forming the second region, and (3) a step of allowing the metal or the alloy to be supported on the support. The invention is not necessarily limited to the three steps, and may have, other than the three steps, for example, a step of coating an ionomer as described later. Below, steps (1) to (3), and the step of coating an ionomer will be sequentially described.

The present step which is a step of forming the first region is a step of forming the first region, in which the temperature of a first supercritical fluid including a precursor of a metal or precursor of an alloy that is dissolved therein is independently controlled.

The procedure of dissolving the precursor in the first supercritical fluid has no particular restriction. In the first region, the first supercritical fluid and the precursor may be mixed to dissolve the precursor in the first supercritical fluid. Alternatively, the first supercritical fluid in which the precursor has been previously dissolved may be transferred to the first region.

Below, there will be shown an example in which in the first region, a first supercritical fluid and a precursor are mixed to dissolve the precursor into the first supercritical fluid. First, in the first region, a gas serving as a raw material is raised in temperature and pressure, thereby to be rendered in a supercritical state. The temperature is raised by means of a first heat exchanger described later. As a specific example of temperature rising, mention may be made of a method of passing a heating medium such as hot water through a heating tube. Then, the precursor is charged into the first region. The precursor may be charged as it is. Alternatively, a solution in which the precursor has been previously dissolved in a solvent or the like may be charged. Still alternatively, the precursor may be charged into the first region since before preparation of the first supercritical fluid. Subsequently, a circulation mechanism described later causes a circulating flow between the first heat exchanger and a support described later. Incidentally, heating by the heater in the second region described later is not performed. Thus, a circulating flow is caused in the reaction system. As a result, the first supercritical fluid can be stirred with efficiency, which enables the precursor to be dissolved in the first supercritical fluid in a short time.

The precursors of the metals for use in the invention may be the precursors of platinum, cobalt, palladium, copper, titanium, gold, silver, ruthenium, chromium, iron, manganese, nickel, rhodium, iridium, and tin. Whereas, the precursors of the alloys for use in the invention may be the precursors of alloys including two or more of the metals. The term "precursor of a metal or precursor of an alloy" in the invention represents a metal compound which changes into a metal or an alloy in a supporting step described later. This represents a metal compound which thermally decomposes into a metal or an alloy. The precursor of a metal or an alloy may be a metal complex or an alloy complex. In the case of a complex, in the supporting step, the ligand is removed, so that the complex changes into a metal or an alloy. When an alloy catalyst is produced, one kind of precursor including two or more kinds of metal atoms may be prepared to be subjected to the present production method. Alternatively, two or more kinds of precursors including different metal atoms may be prepared to be subjected to the present production method. As the case where two or more kinds of precursors including different metal atoms are prepared and used, for example, a platinum complex and a cobalt complex are mixed in the first supercritical fluid, and in a supporting step described later, platinum and cobalt are alloyed, resulting in a platinum/cobalt alloy-supported catalyst.

The first supercritical fluid for use in the invention may be carbon dioxide or trifluoromethane ($CHF_3$). In the invention, the supercritical fluids may be used only alone, or may be used in combination of two thereof. Of the supercritical fluids, the supercritical fluid of carbon dioxide (which may be hereinafter referred to as supercritical $CO_2$) may be used because of easy preparation thereof.

In the first region, the temperature of the precursor-dissolved first supercritical fluid is independently controlled. In the invention, the term "the temperature of the first supercritical fluid" embraces both of the temperature of the first supercritical fluid itself, and the temperature of the precursor-dissolved first supercritical fluid. The method of temperature control has no particular restriction. From the viewpoint of ease of temperature control, the control may be achieved by a heat exchanger (which will be hereinafter referred to as a first heat exchanger). The first heat exchanger may be disposed in the first region. The first heat exchanger has a temperature adjusting function of constantly keeping the temperature of the precursor-dissolved first supercritical fluid. When in the first region, the first supercritical fluid itself is prepared, the first heat exchanger may have a heating function. On the other hand, in order to, in the first region, directly remove the heat of the precursor-dissolved first supercritical fluid heated in the second region described later, and to discharge the heat outside the reaction system (specifically, outside the reaction vessel or the like) with efficiency, the first heat exchanger may have a cooling function.

The first heat exchanger may include a cooling tube through which a refrigerant flows, and/or, a heating tube through which a heating medium flows. The cooling tube and the heating tube are disposed along the circulation path for the precursor-dissolved first supercritical fluid in the inside of the first region, and may be in a structure enabling direct contact with the first supercritical fluid. The cooling tube and the heating tube are desirably in a large surface area structure such as a structure of a ladder shape or a helica shape from the viewpoint of ensuring the maximum contact area with the precursor-dissolved first supercritical fluid, and enhancing the cooling efficiency or the heating efficiency. Particularly, setting of the cooling tube enables the heat applied to the first supercritical fluid in the second region to be efficiently dissipated outside the reaction system. As a result, the temperature of the first region, and the temperature of the first supercritical fluid can be held uniformly. Accordingly, in a supporting step described later, the precipitation of a metal or the like on other sites than the support can be inhibited, which can improve the yield of the catalyst.

From the viewpoint of being capable of causing a convection from the first region to the second region described later, and supplying the precursor remaining in the first region to the support in a short time, the precursor-dissolved first supercritical fluid may be circulated between the first heat exchanger and the support. The mode of circulation has no particular restriction. From the viewpoint of uniformly keeping the temperature of the precursor-dissolved first supercritical fluid in the first region, for example, a circulation mechanism such as a circulation fan may be used. Alternatively, a nozzle of a structure in which the precursor-dissolved first supercritical fluid is directly sprayed to the support may be used in combination with the circulation mechanism. In the inside of the nozzle, there may be disposed a rectifying plate for uniformly spraying the precursor-dissolved first supercritical fluid to the support.

By using the first heat exchanger, the circulation mechanism, and a heater described later in combination, it is possible to constantly keep the difference in temperature between the first region and the second region. As a result, the precursor-dissolved first supercritical fluid can be sprayed onto the support sample surface while being sufficiently cooled. This enables the precursor to be also supplied into the support sample. Incidentally, the term "the support sample" herein used represents the aggregate of supports. The wording "the precursor can be also supplied into the support sample" means that the precursor can be supplied not only to the supports at the aggregate surface but also to the supports into the aggregate.

2. The present step is a step of forming the second region in which the temperature of the support is independently controlled higher than the temperature of the first supercritical fluid.

The support for use in the invention has no particular restriction so long as it is a support commonly used for a metal catalyst. The support may be carbon nanotube, carbon powder, titanium, silicon, tin, copper, titania, silica, or tin oxide. In the invention; only one kind of the support may be used, or two or more kinds of the supports may be used in combination. From the viewpoint of the size of the specific surface area, in the invention, carbon nanotube may be used as the support.

From the viewpoint of allowing the supporting treatment to proceed with reliability, the support may be fixed to a substrate or the like. Alternatively, a matrix may be used. Examples of the support fixed to the substrate may include a carbon nanotube fixed to a silicon substrate, and a carbon black powder pouched by a membrane filter or the like. Examples using a matrix may include an ink or the like prepared by kneading a carbon black powder with a resin such as polytetrafluoroethylene (PTFE). The ink can be also coated on a substrate to be subjected to the invention.

In the second region, the temperature of the support is independently controlled at a higher temperature than the temperature of the first supercritical fluid. The method of temperature control has no particular restriction. From the viewpoint of being capable of locally heating only the support, temperature control by a heater is also acceptable.

The heater may be disposed in the second region. The supercritical fluid is considered to have both properties of a liquid and a gas. Namely, the supercritical fluid has both of a property analogous to that of a liquid of dissolving a substance therein (solubility), and a property analogous to that of a gas of permeating into a substance (permeability). Such properties of the supercritical fluid can be controlled with ease by temperature. When the temperature of the supercritical fluid is high, the density of the supercritical fluid decreases. Accordingly, the property of the supercritical fluid analogous to that of a gas is enhanced. As a result, the permeability is improved, but the solubility is reduced. On the other hand, when the temperature of the supercritical fluid is low, the density of the supercritical fluid increases. Accordingly, the property of the supercritical fluid analogous to that of a liquid is enhanced. As a result, the solubility is improved, but the permeability is reduced. Therefore, by setting the temperature of the support sample higher than the temperature of the first supercritical fluid, and reducing the solubility of the first supercritical fluid at the support sample surface, it is possible to promote the adsorption of the precursor onto the support, and to shorten the supporting treatment time. In tire invention, a difference in temperature may be caused between the precursor-dissolved first supercritical fluid and the support sample surface by disposing a heater for locally heating the support.

Figure 1:
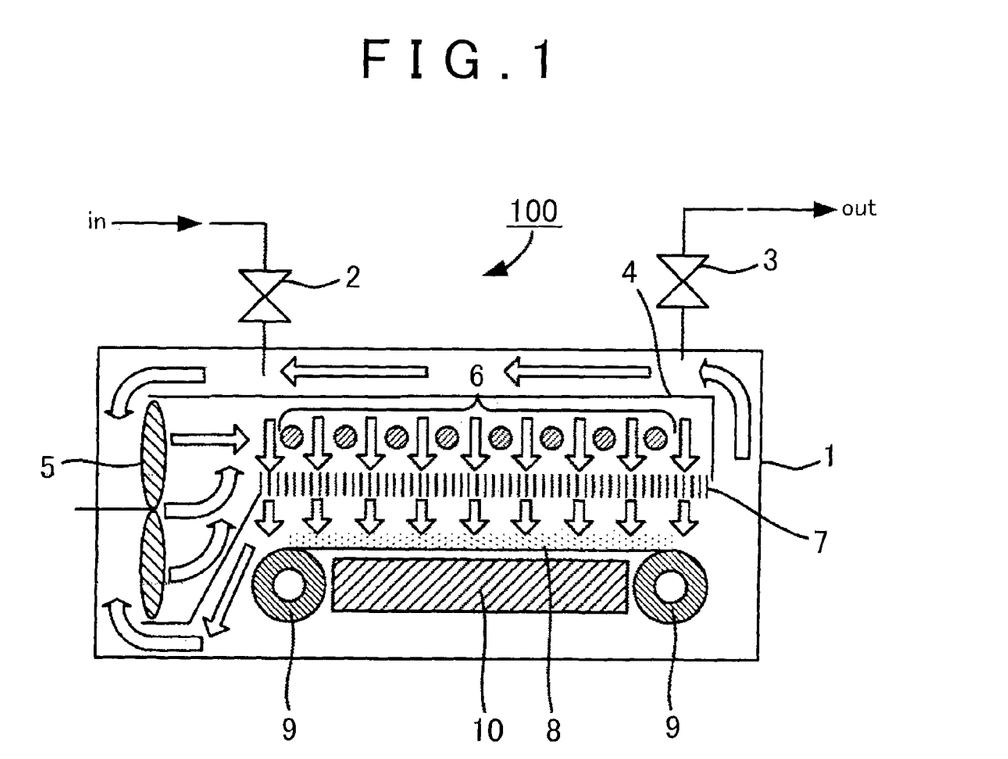
FIG. 1 is a cross-sectional schematic diagram showing a typical example of a catalyst production apparatus in accordance with the invention.

FIG. 1 is a cross-sectional schematic diagram showing a typical example of the catalyst production apparatus in accordance with the invention. The white arrows of FIG. 1 represent the direction of flow in circulation of the first supercritical fluid and the precursor-dissolved first supercritical fluid. Incidentally, the production apparatus of the invention is not necessarily limited to the present typical example. A catalyst production apparatus 100 as the present typical example includes a high pressure reaction vessel 1. To the high pressure reaction vessel 1, there are attached a supply valve 2 and a discharge valve 3. From the supply valve 2, there are supplied a first supercritical fluid, a precursor-dissolved first supercritical fluid, a precursor, and a solution thereof, and an ionomer described later and a solution thereof, and the like. On the other hand, from the discharge valve 3, there are discharged an excess supercritical fluid and the like. The high pressure reaction vessel 1 includes a spray nozzle 4 (first transfer means) for spraying a precursor-dissolved first supercritical fluid. The precursor-dissolved first supercritical fluid supplied from the supply valve 2 is collected in the spray nozzle 4 by a circulation fan 5 disposed at the root portion of the spray nozzle 4. In the spray nozzle 4, a cooling tube 6 is disposed as the first heat exchanger (first temperature control unit), and the precursor-dissolved first supercritical fluid is controlled at a temperature $T_1$ by the cooling tube 6. Incidentally, the setting location of the cooling tube 6 is not necessarily limited to the inside of the spray nozzle 4. The setting location may be outside the spray nozzle 4 so long as it is a site through which the precursor-dissolved first supercritical fluid is almost entirely circulated. Whereas, in the catalyst production apparatus 100, the cooling tube 6 is disposed perpendicular to the plane of the sheet, on which FIG. 1 is drawn. Accordingly, the refrigerant in the cooling tube 6 is also assumed to flow in the direction perpendicular to the plane of the sheet, on which FIG. 1 is drawn. The precursor-dissolved first supercritical fluid at temperature $T_1$ passes through the rectifying plate 7, and directly reaches the roll-transported support sample 8. The support sample 8 is disposed on a surface of the top of a sheet roll-transported by sample rolls 9 facing the rectifying plate 7. A sample heater 10 (second temperature control unit) is disposed on the opposite side of the support sample 8-mounting sheet from the rectifying plate 7. The sample heater 10 enables heating of the support sample 8. The first supercritical fluid passed through the support sample 8 circulates in the high pressure reaction vessel 1, and is collected into the spray nozzle 4 by the circulation fan 5 again. Incidentally, in the high pressure reaction vessel 1, the region including the spray nozzle 4, the cooling tube 6, the rectifying plate 7, and the circulation fan 5 corresponds to the first region. The region including the support sample 8, the sample rolls 9, and the sample heater 10 corresponds to the second region.

3. The present step is a step of: directly transferring a metal or alloy precursor-dissolved first supercritical fluid from the first region to the second region; in the second region, mixing the metal or alloy precursor-dissolved first supercritical fluid and a support having a higher temperature than the temperature of the first supercritical fluid to cause the metal or the alloy to be supported on the support. In the present step, by directly supplying the precursor-dissolved first supercritical fluid and independently temperature-controlled first supercritical fluid to the independently temperature-controlled support, it is possible to constantly keep the difference in temperature between the precursor-dissolved first supercritical fluid and the support which is the supply destination. As a result, it is possible to prevent uneven adsorption of the precursor onto the support, and to prevent the uneven thermal decomposition of the precursor.

In the present supporting step, the precursor in an amount generally equivalent to the amount of precursor consumed by supporting may be continuously or intermittently added to the first supercritical fluid. By thus appropriately adding the precursor, it is possible to supply the precursor to the support without interruption and without adding the first supercritical fluid itself. Examples of the means for adding the precursor in an amount equivalent to the consumption may include the means for directly charging a precursor or a solution thereof from the supply valve.

The present supporting step may be further divided into a step of allowing the precursor to be supported on the support, and a step of thermally decomposing the precursor, and precipitating a metal or an alloy on the support, to be carried out. Namely, a difference may be caused between the temperature for allowing the precursor to be adsorbed on the support and the temperature for thermally decomposing the precursor. When the adsorption step and the precipitation step are performed simultaneously, from the initial stage of the supporting step, decomposition of the precursor occurs on the surface side of the support sample. As a result, diffusion of the precursor into the inside of the support sample becomes insufficient, so that uneven supporting may be caused. Below, a description will be given to the case where the supporting step is performed by being divided into the adsorption, step and the precipitation step.

The temperature ($T_2$) of the support in the adsorption step may be higher than the temperature ($T_1$) of the first supercritical fluid, and less than the temperature at which the precursor is thermally decomposed. In the adsorption step, the difference between the temperature of the first supercritical fluid and the temperature of the support is made relatively smaller. As a result, the precursor is adsorbed to the support in a short time, which can shorten the supporting treatment time. In addition, the local adsorption on the support sample surface is inhibited, which enables a uniform supporting treatment on from the support sample surface to inside.

The difference between the temperature ($T_1$) of the first supercritical fluid and the temperature ($T_2$) of the support in the adsorption step may be set at 5 to 100° C. When the difference between the temperature $T_1$ and the temperature $T_2$ is less than 5° C., the temperature difference is too small. Accordingly, a difference is less likely to be caused in solubility of the supercritical fluid, so that adsorption of the precursor onto the support may not proceed promptly. Therefore, when the difference between the temperature $T_1$ and the temperature $T_2$ is less than 5° C., the entire amount of the precursor in the vessel cannot be adsorbed on the support, which may result in the reduction of the yield of the catalyst. On the other hand, when the difference between the temperature $T_1$ and the temperature $T_2$ exceeds 100° C., the temperature difference is too large. Accordingly, the precursor is locally adsorbed on the support sample surface, and does not permeate into the support sample inside. This may cause uneven supporting. The difference between the temperature $T_1$ and the temperature $T_2$ may be set at 10 to 80° C., and further, may be set at 20 to 50° C.

In the adsorption step, the temperature $T_2$ of the support is held for a predetermined time. The holding time is set at a time enough for the precursor in the reaction system (in the reaction vessel) to be adsorbed in a total amount to the support surface, and for the precursor in the reaction system to be consumed in a total amount. The time of the adsorption step may be set at about 5 minutes to 2 hours depending on the reaction scale.

The temperature ($T_3$) of the support in the precipitation step may be set higher than the temperature ($T_2$) of the support in the adsorption step, and further, may be set equal to or higher than the temperature at which the precursor is thermally decomposed. Thus, in the precipitation step, the precursor is thermally decomposed after having undergone the adsorption step. This prevents the local thermal decomposition at the support sample surface, which enables a uniform supporting treatment on from the support sample surface to inside. Further, in the present precipitation step, while keeping the temperature ($T_1$) of the first supercritical fluid with the first heat exchanger, only the support can be independently raised in temperature. Accordingly, it is possible to inhibit the rise in temperature of the first supercritical fluid, and it is possible to more raise the temperature of the support within the range not exceeding the upper limit of the pressure of the reaction vessel.

The difference between the temperature ($T_2$) of the support in the adsorption step and the temperature ($T_3$) of the support in the precipitation step may be set at 20 to 500° C. When the difference between the temperature $T_2$ and the temperature $T_3$ is less than 20° C., the temperature difference is too small. Accordingly, the thermal decomposition of the precursor may be less likely to proceed. On the other hand, when the difference between the temperature $T_2$ and the temperature $T_3$ exceeds 500° C.; the temperature difference is too large. Accordingly, the temperature control is difficult.

In the precipitation step, the temperature $T_3$ of the support is held for a predetermined time, thereby to allow thermal decomposition to proceed. The holding time is set at a time enough for the precursor supported on the support to be thermally decomposed in a total amount, and to generate a metal or an alloy. The time of the precipitation step may be set at about 5 minutes to 1 hour depending on the reaction scale.

In the precipitation step, there may be adopted means for promoting metallization due to thermal decomposition in combination with temperature rising of the support. As means for promoting metallization, for example, mention may be made of means for adding a reducing agent such as a hydrogen gas from outside the reaction system (outside the reaction vessel).

Figure 2:
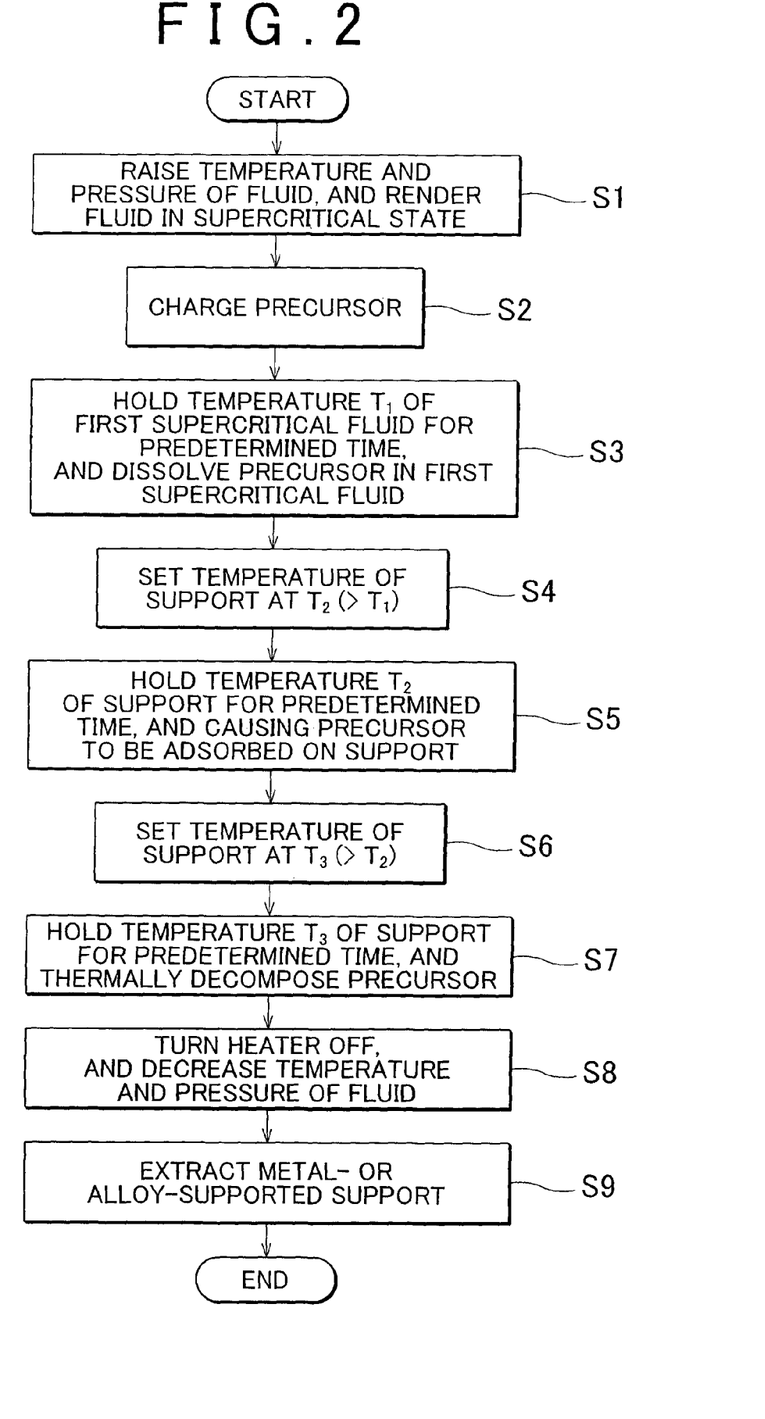
FIG. 2 is a flowchart showing a typical example of a catalyst production method in accordance with the invention.

FIG. 2 is a flowchart showing a typical example of a production method of the invention. Incidentally, the temperatures $T_1$, $T_2$, and $T_3$ in FIG. 2 correspond to the temperature $T_1$ of the first supercritical fluid, the temperature $T_2$ of the support in the adsorption step, and the temperature $T_3$ of the support in the precipitation step, respectively. Below, according to the flowchart of FIG. 2, a description will be given to an example in which a catalyst is produced using the typical example of the production apparatus shown in FIG. 1. Incidentally, the production method of the invention is not necessarily limited to the present typical example. First, a fluid is introduced into the high pressure reaction vessel 1 of FIG. 1, and raised in temperature and pressure, thereby to prepare a first supercritical fluid (S1). In S1, by the circulation fan 5, the first supercritical fluid may be circulated. Then, the precursor is charged into the high pressure reaction vessel 1 (S2). As described above, the precursor itself may be charged, or a solution of the precursor may be charged. The first supercritical fluid is held at temperature $T_1$ for a predetermined time, so that the precursor is dissolved in the first supercritical fluid (S3). In S3, the precursor-dissolved first supercritical fluid spreads in the high pressure reaction vessel 1. Subsequently, the support is raised in temperature from $T_1$ to $T_2$, and is held for a predetermined time, thereby to allow the precursor to be adsorbed on the support (adsorption steps, S4 and S5). After completion of the adsorption step, the precursor is fully adsorbed on from the surface to the inside of the support sample, and is not left in the first supercritical fluid. Incidentally, when the precursor is insufficient, the precursor may be added into the high pressure reaction vessel 1 at this stage. Then, the support is raised in temperature from $T_2$ to $T_3$, and is held for a predetermined time, thereby to thermally decompose the precursor (precipitation steps S6 and S7). After completion of the precipitation step, the precursor is fully thermally decomposed, so that a metal or an alloy is generated on the support. Finally, the sample heater 10 is turned off, so that the fluid is decreased in temperature and pressure. Then, an objective catalyst is extracted from the inside of the high pressure reaction vessel 1 (S8 and S9).

4. A method for coating a catalyst with an ionomer has: (1) a step of forming a third region, (2) a step of forming a fourth region, and (3) a step of coating the ionomer on the catalyst. The invention is not necessarily limited to the three steps. Other than the three steps, there may be provided, for example, a step of extracting the sample after decreasing the temperature and the pressure in the vessel. Below steps (1) to (3) will be sequentially described.

4-1. The present step is a step of forming the third region, in which the temperature of an ionomer-dissolved second supercritical fluid is independently controlled. The present step can be performed in the same manner as the step of forming the first region, except that the ionomer-dissolved second supercritical fluid is used in place of using the metal or alloy precursor-dissolved first supercritical fluid in the step of forming the first region. Therefore, for the present step, the above-described production apparatus can be used as it is. As the third region, the same region as the first region may be used, or a different region from the first region may be used.

In the third region, the temperature of the ionomer-dissolved second supercritical fluid is independently controlled. The method of temperature control has no particular restriction. From the viewpoint of ease of the temperature control, control may be achieved by a heat exchanger (which will be hereinafter referred to as a second heat exchanger): The second heat exchanger may be disposed in the third region. The second heat exchanger may directly remove the heat from the ionomer-dissolved second supercritical fluid heated in the fourth region described later, in the third region. Further, the second heat exchanger has no particular restriction so long as it has a cooling function capable of efficiently discharging a heat outside the reaction system (specifically, outside the reaction vessel or the like). The same one as the first heat exchanger may be used. As the second heat exchanger, for example, the cooling tube and heating tube can be used.

From the viewpoint of being capable of causing a convection from the third region to the fourth region described later, and supplying the ionomer remaining in the third region to the support surface in a short time, the ionomer-dissolved second supercritical fluid may be circulated between the second heat exchanger and the support. The present step is the same as the step of forming the first region in that there can be used a circulation fan, a spray nozzle, and a rectifying plate. By using the second heat exchanger, the circulation fan, and a heater described later in combination, it is possible to constantly keep the difference in temperature between the third region and the fourth region. As a result, the ionomer-dissolved second supercritical fluid can be sprayed onto the support sample surface while being sufficiently cooled. This allows the ionomer to be supplied to the support sample inside.

Below, there will be shown an example in which in the third region, a second supercritical fluid and an ionomer are mixed, thereby to dissolve the ionomer in the second supercritical fluid. First, in the third region, the second supercritical fluid is raised in temperature and pressure, to be rendered in a supercritical state. The temperature is raised by means of the second heat exchanger. As a specific example of temperature rising, mention may be made of a method of passing a heating medium such as hot water through a heating tube. Then, the ionomer is charged into the second region. The ionomer may be charged as it is. Alternatively, a solution in which the ionomer has been previously dissolved in an organic solvent or the like may be charged. Still alternatively, the ionomer may be charged into the third region since before preparation of the second supercritical fluid. Subsequently, a circulating flow is caused between the second heat exchanger and the support described later by the circulation fan. Incidentally, heating by a heater described later is not performed. By thus allowing a circulating flow in the reaction system, it is possible to stir the second supercritical fluid with efficiency. This enables the ionomer to be dissolved in the second supercritical fluid in a short time.

As the ionomers for use in the invention, there can be used hydrocarbon type sulfonate resins such as perfluorocarbon sulfonate resins, aromatic polyether sulfonate resins, aromatic polyimide sulfonate resins, and polybenzsulfonate resins. These ionomers may be used only alone, or may be used in combination of two or more thereof. Out of these ionomers, there may be used perfluorocarbon sulfonate resins such as Nafion (trade name).

As the second supercritical fluids, there may be used trifluoromethane ($CHF_3$), tetrafluoroethylene ($CF_2=CF_2$), 1,1,2,2-tetrafluoroethane ($CHF_2CHF_2$), pentafluoroethane ($CF_3CHF_2$), water, ethanol, or methanol. The supercritical fluids may be used only alone, or may be used in combination of two or more thereof. Out of the supercritical fluids, a supercritical fluid of $CHF_3$ (which may be hereinafter referred to as supercritical $CHF_3$) may be used because of ease of preparation thereof.

4-2. The present step which is a step of forming the fourth region is a step of forming the fourth region, in which the temperature of the support is independently controlled higher than the temperature of the second supercritical fluid.

In the fourth region, the temperature of the support is independently controlled at a higher temperature than the temperature of the second supercritical fluid. The method of temperature control has no particular restriction. From the viewpoint of enabling local heating of only the support, temperature control by a heater is also acceptable. The heater may be disposed in the fourth region. As the heater for use in the present step, there may be used the same one as the heater for use in supporting described above. In the present step, setting of the heater for locally heating the support causes a difference in temperature between the support sample surface and the ionomer-dissolved second supercritical fluid. This results in the promotion of adsorption of the ionomer to the support surface as already described in the explanation of the step of forming the second region, which enables shortening of the coating treatment time. Also when an ionomer is coated on the metal catalyst, a typical example of the production apparatus as shown in FIG. 1 can be used. Therefore, as third temperature control unit for independently controlling the temperature of the ionomer-dissolved second supercritical fluid, there can be used the same means as the first temperature control unit. Whereas, as fourth temperature control unit for independently controlling the temperature of the support higher than the temperature of the second supercritical fluid, there can be used the same means as the second temperature control unit. Further, as second transfer means for directly transferring the ionomer-dissolved second supercritical fluid to the support and the metal or the alloy supported on the support, there can be used the same means as the first transfer means.

4-3. The present step which is a step of coating an ionomer on a catalyst is a step in which the ionomer-dissolved second supercritical fluid is directly transferred from the third region to the fourth region, and in the fourth region, the ionomer-dissolved second supercritical fluid and the support having a higher temperature than the temperature of the second supercritical fluid, and the metal or the alloy supported on the support are mixed, thereby coating the ionomer on the support and the metal or the alloy supported on the support.

In the present coating step, the ionomer in an amount generally equivalent to the amount of the ionomer consumed by coating may be continuously or intermittently added to the second supercritical fluid. By thus appropriately adding the ionomer, it is possible to continuously supply the ionomer to the support without adding the second supercritical fluid itself Examples of the means for adding the ionomer in an amount equivalent to the consumption may include the means for directly charging an ionomer or a solution thereof from the supply valve.

The temperature ($T_5$) of the support in the coating step is higher than the temperature ($T_4$) of the second supercritical fluid. In the coating step, the difference between the temperature of the second supercritical fluid and the temperature of the support is made relatively smaller. As a result, the ionomer coats the metal or the alloy in a short time, which can shorten the coating treatment time. In addition, the local coating of the metal or the alloy supported on the support sample surface is inhibited, which enables a uniform coating treatment on from the support sample surface to inside.

The difference between the temperature ($T_4$) of the second supercritical fluid and the temperature ($T_5$) of the metal or the alloy supported on the support in the coating step may be set at 5 to 100° C. When the difference between the temperature $T_4$ and the temperature $T_5$ is less than 5° C., the temperature difference is too small. Accordingly, a difference is less likely to be caused in solubility of the supercritical fluid, so that coating of the ionomer may not proceed promptly. Therefore, when the difference between the temperature $T_4$ and the temperature $T_5$ is less than 5° C., the entire amount of the ionomer in the vessel cannot be coated on the support, which may result in the reduction of the yield of the catalyst. On the other hand, when the difference between the temperature $T_4$ and the temperature $T_5$ exceeds 100° C., the temperature difference is too large. Accordingly, the ionomer locally coats the metal or the alloy on the support sample surface, so that the metal or the alloy in the inside of the support sample is not coated with the ionomer. This may cause uneven coating. The difference between the temperature $T_4$ and the temperature $T_5$ may be set at 10 to 100° C., and further, may be set at 20 to 100° C.

In the coating step, the temperature $T_5$ of the support is held for a predetermined time. The holding time is set at a time enough for the ionomer in the reaction system to be coated in a total amount on the catalyst, and for the ionomer in the reaction system to be consumed in a total amount. The time of the coating step may be set at about 5 minutes to 2 hours depending on the reaction scale.

Figure 3:
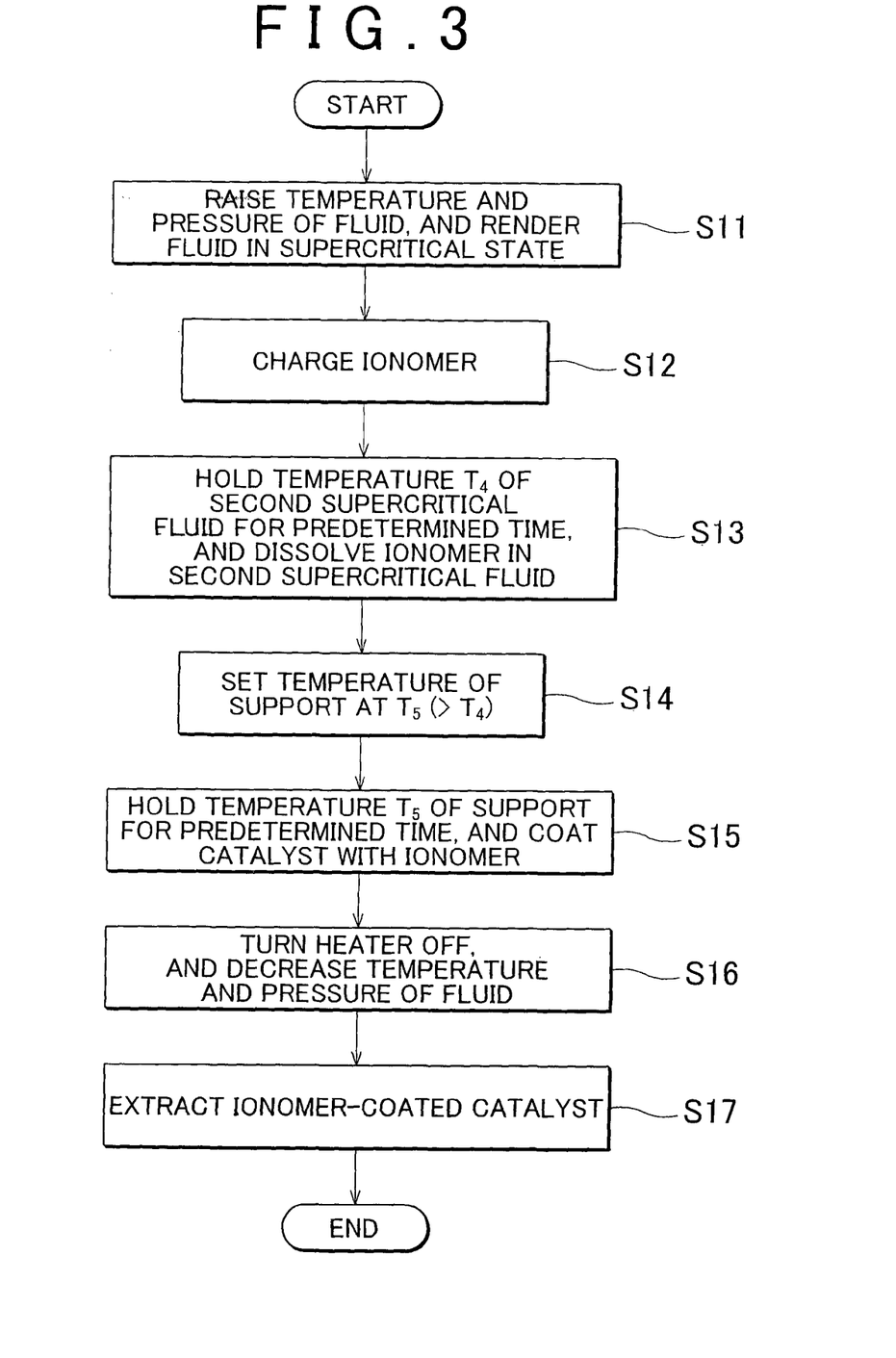
FIG. 3 is a flowchart showing a typical example of a coating step in the invention.

FIG. 3 is a flowchart showing a typical example of the step of coating an ionomer. Incidentally, the temperatures $T_4$ and $T_5$ in FIG. 3 correspond to the temperature $T_4$ of the second supercritical fluid and the temperature $T_5$ of the support in the coating step, respectively. Below, according to the flowchart of FIG. 3, a description will be given to an example in which a catalyst is produced using the typical example of the production apparatus shown in FIG. 1. Incidentally, the method for coating an ionomer on a catalyst is not necessarily limited to the present typical example. First, a fluid is introduced into the high pressure reaction vessel 1 of FIG. 1, and raised in temperature and pressure, thereby to prepare a second supercritical fluid (S11). In S11, by the circulation fan 5, the second supercritical fluid may be circulated. Then, the ionomer is charged into the high pressure reaction vessel 1 (S12). The second supercritical fluid is held at temperature $T_4$ for a predetermined time, so that the ionomer is dissolved in the second supercritical fluid (S13). In S13, the ionomer-dissolved second supercritical fluid spreads in the high pressure reaction vessel 1. Subsequently, the support is raised in temperature to $T_5$, and is held for a predetermined time, thereby to allow the ionomer to be coated on the catalyst, namely, the support and the metal or the alloy supported on the support (coating steps, S14 and S15). The circulation fan and the cooling mechanism are operated, and a difference in temperature is caused between the second supercritical fluid and the support. As a result, it is possible to inhibit the ionomer from being unevenly coated on the support sample surface, and the ionomer from being precipitated on other sites than the support sample, such as the wall surface of the high pressure reaction vessel 1. After completion of the coating step, the ionomer is fully consumed, and is not left in the second supercritical fluid. Incidentally, when the ionomer is insufficient, the ionomer may be added into the high pressure reaction vessel 1 at this stage. Finally, the sample heater 10 is turned off, so that the fluid is decreased in temperature and pressure. Then, a catalyst of the ionomer-coated support or metal or alloy supported on the support is extracted from the inside of the high pressure reaction vessel 1 (S16 and S17):

The electrode catalyst for fuel cell of the invention is characterized by being produced by the above-described catalyst production method. The electrode catalyst for fuel cell of the invention is higher in catalyst ability than the electrode catalysts for fuel cell of the related art because the catalyst metal or the catalyst alloy is supported evenly on from the surface to the inside of the support. Further, the electrode catalyst for fuel cell of the first aspect of the invention is higher in ion conductivity than related art electrode catalysts for fuel cell because the ionomer is coated evenly on from the surface to the inside of the support.

Below, the invention will be further specifically described by way of examples and comparative examples. However, the invention is not limited to only the examples.

1. Production of Platinum-Supported Carbon Nanotube

Example 1

Using the production apparatus schematically shown in FIG. 1, platinum was supported on a carbon support. First, an n-hexane solution of dimethyl(cyclooctadienyl)platinum (II) (platinum precursor) was prepared. Then, on a sheet roll-transported by the sample rolls 9 in the high pressure reaction vessel 1, a carbon nanotube (multi wall carbon nanotube (MWCNT), 10 nm in average diameter, 10 μm in average length) was mounted as the support. Subsequently, carbon dioxide was filled in the high pressure reaction vessel 1. Thus, 70° C. hot water was supplied to the cooling tube 6, and the pressure in the high pressure reaction vessel 1 was set at 10 MPa. As a result, carbon dioxide was changed into a supercritical fluid (first supercritical fluid) (which may be hereinafter referred to as supercritical $CO_2$). Into the high pressure reaction vessel 1 filled with the supercritical $CO_2$, added was an n-hexane solution of the platinum precursor. After addition of the n-hexane solution, the mixture was allowed to stand for 10 minutes, so that the platinum precursor was dissolved in the supercritical $CO_2$. Incidentally, almost simultaneously with the addition of the n-hexane solution, circulation of the supercritical $CO_2$ in the high pressure reaction vessel 1 by the circulation fan 5 was started. This circulation caused the platinum precursor-dissolved supercritical $CO_2$ (temperature $T_1=70°$ C.) to spread in the high pressure reaction vessel 1. Then, the temperature of the sample heater 10 was raised to 100° C. Thus, the platinum precursor-dissolved supercritical $CO_2$ (temperature $T_1=70°$ C.) was continuously supplied directly to the carbon nanotube (temperature $T_2=100°$ C.) on the sheet on the sample rolls 9.

After 30 minutes from the start of supply of the platinum precursor dissolved supercritical $CO_2$, the temperature of the sample heater 10 was raised to 300° C. Thus, the platinum precursor adsorbed on the carbon nanotube (temperature $T_3=300°$ C.) was thermally decomposed, so that platinum was supported on the carbon nanotube. The sample was kept as it was for 10 minutes, resulting in a platinum-supported carbon nanotube of Example 1.

Example 2

The procedure until the platinum precursor is dissolved in the supercritical $CO_2$ is the same as that in Example 1. Then, the temperature of the sample heater 10 was raised to 150°

C. Thus, the platinum precursor-dissolved supercritical $CO_2$ (temperature $T_1=70°$ C.) was continuously directly supplied to the carbon nanotube (temperature $T_2=150°$ C.) on the sheet on the sample rolls 9. After 10 minutes from the start of supply of the platinum precursor-dissolved supercritical $CO_2$, the temperature of the sample heater 10 was raised to 300° C. Thus, the platinum precursor adsorbed on the carbon nanotube (temperature $T_3=300°$ C.) was thermally decomposed, so that platinum was supported on the carbon nanotube. The sample was kept as it was for 10 minutes, resulting in a platinum-supported carbon nanotube of Example 2.

Comparative Example 1

The procedure until the platinum precursor is dissolved in the supercritical $CO_2$ is the same as that in Example 1. Then, the temperature of the sample heater 10 was raised to 300° C. Thus, the platinum precursor-dissolved supercritical $CO_2$ (temperature $T_1=70°$ C.) was continuously directly supplied to the carbon nanotube (temperature $T_3=300°$ C.) on the sheet on the sample rolls 9. In addition, the platinum precursor adsorbed on the carbon nanotube was thermally decomposed, so that platinum was supported on the carbon nanotube. The sample was kept as it was for 10 minutes, resulting in a platinum-supported carbon nanotube of Comparative Example 1. Namely, in Comparative Example 1, as distinct from Example 1, the adsorption of the platinum precursor on the carbon nanotube, and the thermal decomposition of the platinum precursor adsorbed on the carbon nanotube were performed at the same time.

Comparative Example 2

Figure 4:
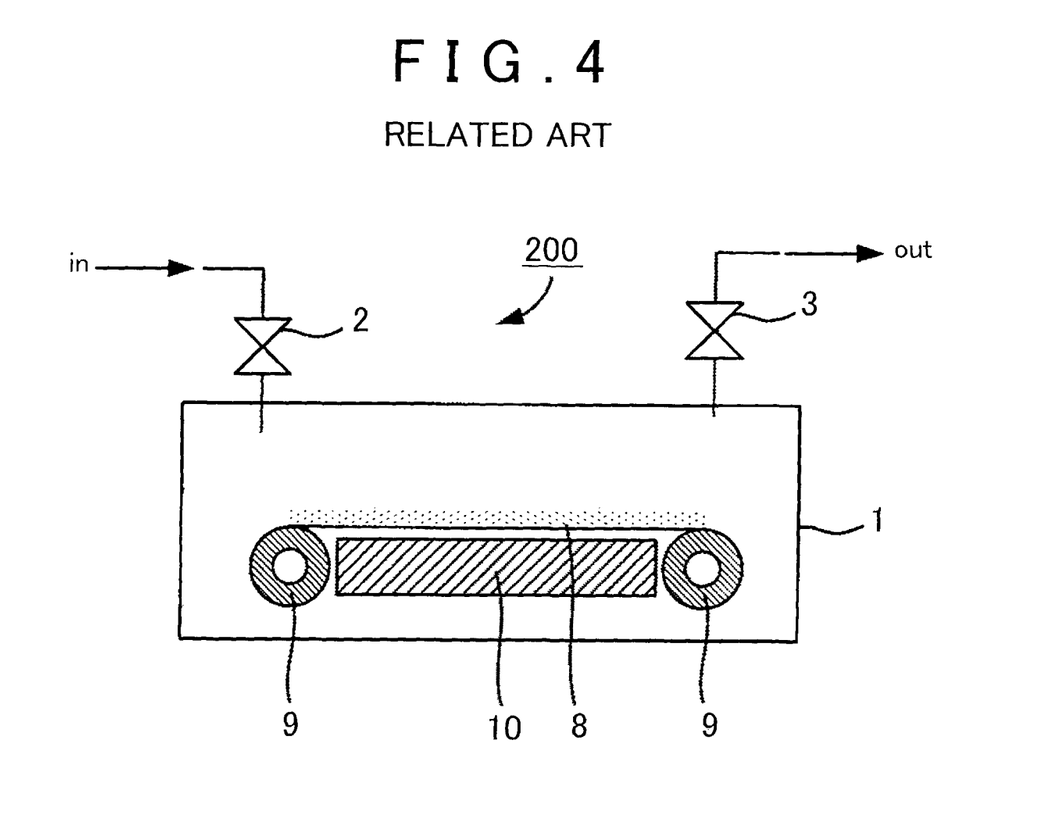
FIG. 4 is a cross-sectional schematic diagram showing a catalyst production apparatus of a related technology.

In Comparative Example 2, a catalyst production apparatus of the related art shown in FIG. 4 was used in place of the catalyst production apparatus shown in FIG. 1. FIG. 4 is a cross-sectional schematic diagram showing the catalyst production apparatus of the related art. A catalyst production apparatus 200 of the related art shown in FIG. 4 is, as distinct from the catalyst production apparatus shown in FIG. 1, provided, in the high pressure reaction vessel 1, with only the sample rolls 9, the support sample 8 on the sheet roll-transported by the sample rolls 9, and the sample heater 10. The procedure until the platinum precursor is dissolved in the supercritical $CO_2$ is the same as that of Example 1, except that the catalyst production apparatus of the related art shown in FIG. 4 is used in place of the catalyst production apparatus shown in FIG. 1. Then, the temperature of the sample heater 10 was raised to 300° C. Thus, the platinum precursor-dissolved supercritical $CO_2$ (temperature $T_1=70°$ C.) was continuously directly supplied to the carbon nanotube (temperature $T_3=300°$ C.) on the sheet on the sample rolls 9. In addition, the platinum precursor adsorbed on the carbon nanotube was thermally decomposed, so that platinum was supported on the carbon nanotube. The sample was kept as it was for 10 minutes, resulting in a platinum-supported carbon nanotube of Comparative Example 2. Namely, in Comparative Example 2, as distinct from Example 1, a reaction vessel not equipped with a circulation fan and a heat exchanger was used, and the adsorption of the platinum precursor on the carbon nanotube, and the thermal decomposition of the platinum precursor adsorbed on the carbon nanotube were performed at the same time.

2. Evaluation of Platinum-Supported Carbon Nanotube

The platinum-supported carbon nanotubes of Example 1 and Example 2, and Comparative Example 1 and Comparative Example 2 were evaluated for the uniformity of the supporting state of platinum in the direction of cross section of each sample. The details of the measurement method were as follows. First, each carbon nanotube sample after a supporting treatment was embedded in a resin. Then, a cross section serving as an observation surface was cut flatly by means of a microtome. Then, by a transmission electron microscope (TEM), three points of the top part, the middle part, and the bottom part of the sample were observed, thereby to evaluate the amount of platinum present. Further, the distribution of the amount of platinum present at from the top part to the bottom part of the sample was evaluated by means of the scanning electron microscope—energy dispersive X-ray spectroscopy (SEM-EDX). Table 1 below is a table summarizing the production conditions and results of Example 1 and Example 2, and Comparative Example 1 and Comparative Example 2. Incidentally, the term "sample" in Table 1 below represents the aggregate of carbon nanotubes on the sheet on the sample rolls 9. Further, the yields were almost 100% in both of Example 1 and Example 2.

TABLE 1

|  | Apparatus | Circulation of supercritical fluid | Cooling by cooling tube |
|---|---|---|---|
| Ex. 1 | FIG. 1 | Caused | Performed |
| Ex. 2 | FIG. 1 | Caused | Performed |
| Comp. Ex. 1 | FIG. 1 | Caused | Performed |
| Comp. Ex. 2 | FIG. 4 | Not caused | Not performed |

| | Dissolution step | | Adsorption step | | Precipitation step | | |
|---|---|---|---|---|---|---|---|
| | Supercritical fluid temperature $T_1$ (° C.) | Treatment time (min) | Support temperature $T_2$ (° C.) | Treatment time (min) | Support temperature $T_3$ (° C.) | Treatment time (min) | Results |
| Ex. 1 | 70 | 10 | 100 | 30 | 300 | 10 | *1 |
| Ex. 2 | 70 | 10 | 150 | 10 | 300 | 10 | *2 |

TABLE 1-continued

| | | | | | | | |
|---|---|---|---|---|---|---|---|
| Comp. Ex. 1 | 70 | 10 | — | — | 300 | 10 | *3 |
| Comp. Ex. 2 | 70 | 10 | — | — | 300 | 10 | *4 |

*1 Platinum was evenly supported on from the surface to the inside of the sample.
*2 Platinum was unevenly supported in a larger amount on the surface side of the sample.
*3 Platinum was unevenly supported only on the surface side of the sample.
*4 Platinum was not supported on the sample.

As indicated from Table 1 shown above, in Comparative Example 2, the apparatus shown in FIG. 4 of the catalyst production apparatus of the related art was used, and the adsorption of the platinum precursor on the carbon nanotube and the thermal decomposition of the platinum precursor adsorbed on the carbon nanotube were performed simultaneously. In this case, platinum was not supported on the sample at all. The result indicates the following: when the apparatus shown in FIG. 4 not equipped with a circulation mechanism and a heat exchanger is used, the temperature of the supercritical $CO_2$ solution is increased gradually by the sample heater 10. This reduces the difference between the temperature of the platinum precursor-dissolved supercritical $CO_2$ and the temperature of the carbon nanotube. This results in the reduction of the difference between the solubility in the supercritical $CO_2$ and the solubility of carbon nanotube at the sample surface, indicating that platinum supporting is not performed effectively at all.

Further, as indicated from Table 1 shown above, in Comparative Example 1 in which the catalyst production apparatus shown in FIG. 1 was used, and the adsorption of the platinum precursor on the carbon nanotube and the thermal decomposition of the platinum precursor adsorbed on the carbon nanotube were performed simultaneously, platinum was supported unevenly only on the surface side of the sample. The result indicates the following: when the adsorption of the platinum precursor on the carbon nanotube, and the thermal decomposition of the platinum precursor adsorbed on the carbon nanotube are performed simultaneously, the difference between the solubility at a 300° C. carbon nanotube and the solubility at a 70° C. supercritical $CO_2$ is too large; accordingly, the platinum precursor dissolved in the supercritical $CO_2$ is precipitated at the instant of coming into contact with the sample surface of the carbon nanotube, so that the platinum precursor does not permeate into the inside of the sample.

On the other hand, as indicated from Table 1 shown above, in Example 2, the catalyst production apparatus shown in FIG. 1 was used, in addition, the platinum precursor was adsorbed on the carbon nanotube at 150° C., and the platinum precursor adsorbed on the carbon nanotube was thermally decomposed at 300° C. In this case, platinum was unevenly supported in a larger amount on the surface side of the sample. The result indicates the following: the step in which the platinum precursor is adsorbed on the carbon nanotube is separated from the step in which the platinum precursor adsorbed on the carbon nanotube is thermally decomposed, thereby to precipitate platinum; as a result, it is possible to supply the platinum precursor into the inside of the sample in the adsorption step. However, the result indicates the following: the difference between the solubility at a 150° C. carbon nanotube and the solubility at a 70° C. supercritical $CO_2$ is still large; accordingly, most of the platinum precursor dissolved in the supercritical $CO_2$ is precipitated at the instant of coming into contact with the surface of the sample of the carbon nanotube; accordingly, the amount of platinum precursor supplied to the inside of the sample is smaller than to the surface of the sample.

Further, as indicated from Table 1 shown above, in Example 1, the catalyst production apparatus shown in FIG. 1 was used, in addition, the platinum precursor was adsorbed on the carbon nanotube at 100° C., and the platinum precursor adsorbed on the carbon nanotube was thermally decomposed at 300° C. In this case, platinum was evenly supported on from the surface to the inside of the sample. The result indicates the following: the step in which the platinum precursor is adsorbed on the carbon nanotube is separated from the step in which the platinum precursor adsorbed on the carbon nanotube is thermally decomposed, thereby to precipitate platinum, further, the difference between the temperature ($T_1$=70° C.) of the supercritical $CO_2$ and the temperature ($T_2$=100° C.) of the carbon nanotube upon adsorption is made smaller than that in Example 2; in addition, the adsorption step is performed longer than in Example 2; as a result, a sufficient amount of the platinum precursor is supplied to the inside of the sample, so that the platinum precursor evenly permeates throughout the sample. The comparison between the results of Example 1 and Example 2, and the results of Comparative Example 1 and Comparative Example 2 indicates the following: the step in which the platinum precursor is adsorbed on the carbon nanotube is separated from the step in which the platinum precursor adsorbed on the carbon nanotube is thermally decomposed, thereby to precipitate platinum; as a result, a heat treatment for a shorter time than in the related art enables platinum to be evenly supported into the inside of the sample of the carbon nanotube.

3. Production of Ionomer-Coated Platinum-Supported Carbon Nanotube

Example 3

Using the apparatus schematically shown in FIG. 1, an ionomer was coated on a platinum-supported carbon nanotube. First, on a sheet roll-transported by the sample rolls 9 in the high pressure reaction vessel 1, the platinum-supported carbon nanotube of Example 1 was mounted. Then, trifluoromethane ($CHF_3$) was filled in the high pressure reaction vessel 1. Thus, 50° C. hot water was supplied to the cooling tube 6, and the pressure in the high pressure reaction vessel 1 was set at 10 MPa. As a result, trifluoromethane was changed into a supercritical fluid (second supercritical fluid) (which may be hereinafter referred to as supercritical $CHF_3$). Into the high pressure reaction vessel 1 filled with the supercritical $CHF_3$, added was commercially available Nafion (trade name) solution (manufactured by DuPont Co., DE2020CS). After addition of the Nafion solution, the mixture was allowed to stand for 10 minutes, so that Nafion was dissolved in the supercritical $CHF_3$. Incidentally, almost simultaneously with the addition of the Nafion solution, circulation of the supercritical $CHF_3$ in the high pressure reaction vessel 1 by the circulation fan 5 was started. This circulation caused the Nafion-dissolved supercritical $CHF_3$ (temperature $T_4$=50° C.) to spread in the high pressure reaction vessel 1. Then, the temperature of the sample heater 10 was raised to 70° C. Thus, the Nafion-dissolved supercritical $CHF_3$ (temperature $T_4$=50° C.) was continuously directly supplied to the platinum-supported carbon nanotube (temperature $T_5$=70° C.) on the sheet on the sample rolls 9 for 30 minutes, resulting in an ionomer-coated platinum-supported carbon nanotube of Example 3.

Example 4

The procedure until Nafion is dissolved in the supercritical $CHF_3$ is the same as that in Example 3. Then, the temperature of the sample heater 10 was raised to 150° C. Thus, the Nafion-dissolved supercritical $CHF_3$ (temperature $T_4$=50° C.) was continuously directly supplied to the platinum-supported carbon nanotube (temperature $T_5$=150° C.) on the sheet on the sample rolls 9 for 10 minutes, resulting in an ionomer-coated platinum-supported carbon nanotube of Example 4.

Comparative Example 3

In Comparative Example 3, a catalyst production apparatus of the related art shown in FIG. 4 was used in place of the catalyst production apparatus shown in FIG. 1. The procedure until the Nafion is dissolved in the supercritical $CHF_3$ is the same as that of Example 3, except that the catalyst production apparatus of the related art shown in FIG. 4 is used in place of the catalyst production apparatus shown in FIG. 1. Then, the temperature of the sample heater 10 was raised to 70° C. Thus, the Nafion-dissolved supercritical $CHF_3$ (temperature $T_4$≥50° C.) was continuously directly supplied to the platinum-supported carbon nanotube (temperature $T_5$=70° C.) on the sheet on the sample rolls 9 for 10 minutes, resulting in an ionomer-coated platinum-supported carbon nanotube of Comparative Example 3. Namely, in Comparative Example 3, as distinct from Example 3, a reaction vessel not equipped with a circulation fan and a heat exchanger was used and the supply time of the supercritical $CHF_3$ solution of Nafion was set at 10 minutes.

4. Evaluation of Ionomer-Coated Platinum-Supported Carbon Nanotube

The ionomer-coated platinum-supported carbon nanotubes of Example 3 and Example 4, and Comparative Example 3 were evaluated for the uniformity of the coating state of the ionomer in a direction of cross section of each sample. The details of the measuring method are as follows. First, each sample after a coating treatment was stained with osmium, and then was embedded in a resin. Then, a cross section serving as an observation surface was cut flatly by means of a microtome. Then, by a TEM, three points of the top part, the middle part, and the bottom part of the sample were observed, thereby to evaluate the coating thickness of the ionomer. Further, the distribution of the amount of the ionomer (F component) present at from the top part to the bottom part of the sample was evaluated by means of the SEM-EDX. Table 2 below is a table summarizing the production conditions and results of Example 3 and Example 4, and Comparative Example 3. Incidentally, the term "sample" in Table 2 below represents the aggregate of platinum-supported carbon nanotubes on the sheet on the sample rolls 9. Further, the yields were almost 100% in both of Example 3 and Example 4.

TABLE 2

|  | Apparatus | Circulation of supercritical fluid | Cooling by cooling tube |
| --- | --- | --- | --- |
| Ex. 3 | FIG. 1 | Caused | Performed |
| Ex. 4 | FIG. 1 | Caused | Performed |
| Comp. Ex. 3 | FIG. 4 | Not caused | Not performed |

|  | Dissolution step | | Coating step | | |
| --- | --- | --- | --- | --- | --- |
|  | Supercritical fluid temperature $T_4$ (° C.) | Treatment time (min) | Support temperature $T_5$ (° C.) | Treatment time (min) | Results |
| Ex. 3 | 50 | 10 | 70 | 30 | *1 |
| Ex. 4 | 50 | 10 | 150 | 10 | *2 |
| Comp. Ex. 3 | 50 | 10 | 70 | 10 | *3 |

*1 Almost the entire amount of the ionomer coated the sample. The ionomer coated evenly from the surface to the inside of the sample.
*2 Almost the entire amount of the ionomer coated the sample. The ionomer coated unevenly in a larger amount on the surface side of the sample.
*3 Most of the ionomer was precipitated on the reaction vessel wall surface.

As indicated from Table 2 shown above, in Comparative Example 3 in which the apparatus shown in FIG. 4 of the catalyst production apparatus of the related art was used, most of the ionomer was precipitated on the wall surface of the reaction vessel. The result indicates the following: when the apparatus shown in FIG. 4 not equipped with a circulation mechanism and a heat exchanger is used, the temperature of the supercritical $CHF_3$ is gradually increased by the sample heater 10; accordingly, the solubility in the supercritical $CHF_3$ is reduced; as a result, most of the ionomer is precipitated on the wall surface of the reaction vessel before coming in contact with the sample.

On the other hand, as indicated from Table 2 shown above, in Example 4, the catalyst production apparatus shown in FIG. 1 was used, and the platinum-supported carbon nanotube was coated with the ionomer at 150° C. In this case, almost the entire amount of the ionomer coated the sample, but the ionomer was coated unevenly on the surface side of the sample. The result indicates the following: by using the catalyst production apparatus shown in FIG. 1, the temperature of the supercritical $CHF_3$ is constantly set lower than the temperature of the sample, and the solubility at the supercritical $CHF_3$ is set higher than the solubility at the sample surface; as a result, the ionomer can be efficiently coated on the sample. However, the result indicates the following: the difference between the solubility at the sample surface of the 150° C. platinum-supported carbon nanotube and the solubility at the 50° C. supercritical $CHF_3$ is large; accordingly, most of the ionomer dissolved in the supercritical $CHF_3$ is precipitated at the instant of coming in contact with the sample surface of the platinum-supported carbon nanotube, so that the amount of the ionomer supplied to the inside of the sample is smaller than to the surface of the sample.

Further, as indicated from Table 2 shown above, in Example 3, the catalyst production apparatus shown in FIG. 1 was used, and the platinum-supported carbon nanotube was coated with the ionomer at 70° C. In this case, almost the entire amount of the ionomer coated the sample, and the ionomer coated uniformly from the surface to the inside of the sample. The result indicates the following: the difference between the temperature ($T_4$=50° C.) of the supercritical CHF$_3$ and the temperature (T$_5$=70° C.) of the platinum-supported carbon nanotube when coated with the ionomer is made smaller than that in Example 4, and the coating step is performed longer than in Example 4; as a result, a sufficient amount of the ionomer is supplied to the inside of the sample, so that the ionomer permeates uniformly throughout the entire sample.

The invention claimed is:

1. A method for producing a catalyst supporting a metal or an alloy on a support therein, comprising the steps of:
   independently controlling a temperature of a first supercritical fluid so that the temperature of the first supercritical fluid is a first temperature by a first heat exchanger, the first supercritical fluid containing a precursor of the metal or precursor of the alloy that is dissolved in the first supercritical fluid;
   independently controlling a temperature of the support so that the temperature of the support is a second temperature higher than the temperature of the first supercritical fluid; and
   supplying the first supercritical fluid, the temperature of which has been controlled to be the first temperature, to the support, to cause the metal or the alloy to be supported on the support, in the supplying the first supercritical fluid, the first supercritical fluid is circulated between the first heat exchanger and the support,
   the first supercritical fluid controlled to be the first temperature is supplied to the support to cause the precursor to be adsorbed on the support; and then,
   the precursor is thermally decomposed at a third temperature to cause the metal or the alloy to be precipitated on the support, and
   the second temperature of the support is higher than the first temperature of the first supercritical fluid, and less than the third temperature at which the precursor is thermally decomposed.

2. The catalyst production method according to claim 1, wherein
   the precursor is added to the first supercritical fluid in an amount equivalent to an amount of the precursor consumed to cause the metal or the alloy to be supported on the support.

3. The catalyst production method according to claim 1, wherein
   a difference between the first temperature of the first supercritical fluid and the second temperature of the support is set at 5° C. to 100° C.

4. The catalyst production method according to claim 1, wherein
   a difference between the second temperature of the support and the third temperature of the support is set at 20° C. to 500° C.

5. The catalyst production method according to claim 1, wherein
   the third temperature of the support is equal to or higher than a temperature at which the precursor is thermally decomposed.

6. The catalyst production method according to claim 1, wherein
   the metal is selected from the group consisting of platinum, cobalt, palladium, copper, titanium, gold, silver, ruthenium, chromium, iron, manganese, nickel, rhodium, iridium, and tin and the alloy includes two or more metals selected from the group consisting of platinum, cobalt, palladium, copper, titanium, gold, silver, ruthenium, chromium, iron, manganese, nickel, rhodium, iridium, and tin.

7. The catalyst production method according to claim 1, wherein
   the support is at least one support selected from the group consisting of carbon nanotube, carbon powder, titanium, silicon, tin, copper, titania, silica, and tin oxide.

8. The catalyst production method according to claim 1, wherein
   the first supercritical fluid is at least one supercritical fluid selected from the group consisting of carbon dioxide, and trifluoromethane (CHF$_3$).

9. An electrode catalyst for fuel cell, wherein
   the electrode catalyst is produced by the catalyst production method according to claim 1.

10. A method for producing a catalyst supporting a metal or an alloy on a support therein, comprising the steps of:
   independently controlling a temperature of a first supercritical fluid so that the temperature of the first supercritical fluid is a first temperature by a first heat exchanger, the first supercritical fluid containing a precursor of the metal or precursor of the alloy that is dissolved in the first supercritical fluid;
   independently controlling a temperature of the support so that the temperature of the support is a second temperature higher than the temperature of the first supercritical fluid; and
   supplying the first supercritical fluid, the temperature of which has been controlled to be the first temperature, to the support, to cause the metal or the alloy to be supported on the support, in the supplying the first supercritical fluid, the first supercritical fluid is circulated between the first heat exchanger and the support,
   the first supercritical fluid controlled to be the first temperature is supplied to the support to cause the precursor to be adsorbed on the support; and then,
   the precursor is thermally decomposed at a third temperature to cause the metal or the alloy to be precipitated on the support, and
   the third temperature of the support is higher than the second temperature of the support.

11. The catalyst production method according to claim 10, wherein
   a difference between the second temperature of the support and the third temperature of the support is set at 20° C. to 500° C.

12. A method for producing a catalyst supporting a metal or an alloy on a support therein, comprising the steps of:
   independently controlling a temperature of a first supercritical fluid so that the temperature of the first supercritical fluid is a first temperature by a first heat exchanger, the first supercritical fluid containing a precursor of the metal or precursor of the alloy that is dissolved in the first supercritical fluid;
   independently controlling a temperature of the support so that the temperature of the support is a second temperature higher than the temperature of the first supercritical fluid; and
   supplying the first supercritical fluid, the temperature of which has been controlled to be the first temperature, to the support, to cause the metal or the alloy to be supported on the support, in the supplying the first supercritical fluid, the first supercritical fluid is circulated between the first heat exchanger and the support wherein,
   a temperature of a second supercritical fluid containing an ionomer dissolved therein is independently controlled to be a fourth temperature;

the temperature of the support is independently controlled to be a fifth temperature higher than the fourth temperature of the second supercritical fluid; and the second supercritical fluid controlled to be the fourth temperature is supplied to the support and the metal or the alloy supported on the support, to coat the support and the metal or the alloy supported on the support with the ionomer.

13. The catalyst production method according to claim 12, wherein a second heat exchanger for controlling the temperature of the second supercritical fluid so that the temperature of the second supercritical fluid is the fourth temperature is disposed, and the second supercritical fluid controlled to be the fourth temperature is circulated between the second heat exchanger and the support to supply the second supercritical fluid to the support.

14. The catalyst production method according to claim 12, wherein the ionomer is added to the second supercritical fluid in an amount equivalent to an amount of the ionomer consumed by coating the support, and the metal or the alloy supported on the support with the ionomer.

15. The catalyst production method according to claim 12, wherein a difference between the fourth temperature of the second supercritical fluid and the fifth temperature of the support is set at 5° C. to 100° C.

16. The catalyst production method according to claim 12, wherein the ionomer is at least one ionomer selected from the group consisting of perfluorocarbon sulfonate resins, aromatic polyether sulfonate resins, aromatic polyimide sulfonate resins, and polybenzsulfonate resins.

17. The catalyst production method according to claim 12, wherein the second supercritical fluid is at least one supercritical fluid selected from the group consisting of trifluoromethane ($CHF_3$), tetrafluoroethylene ($CF_2=CF_2$), 1,1,2,2-tetrafluoroethane ($CHF_2CHF_2$), pentafluoroethane ($CF_3CHF_2$), water, ethanol, and methanol.

* * * * *